J. G. UTZ.
VEHICLE SPRING.
APPLICATION FILED FEB. 17, 1915.
1,330,923.
Patented Feb. 17, 1920.
2 SHEETS—SHEET 1.
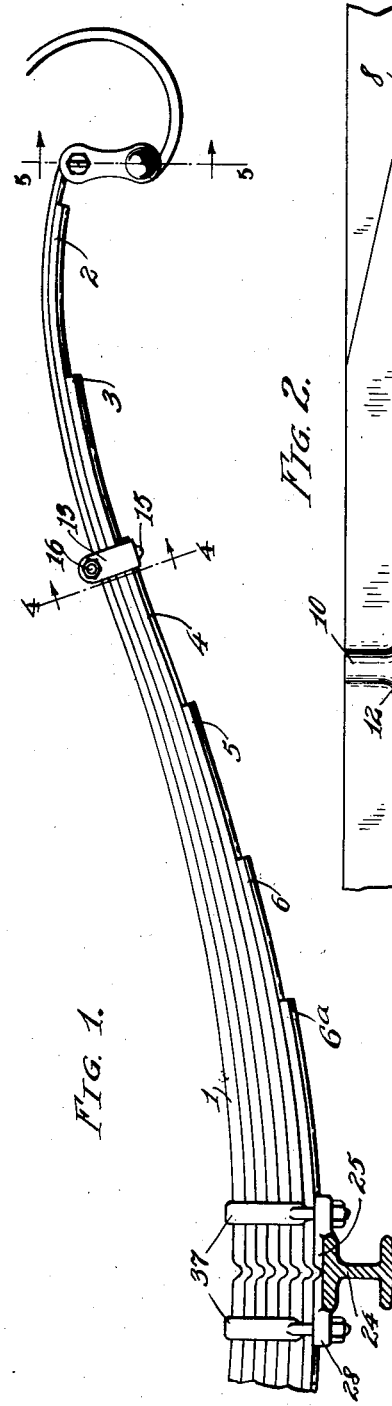
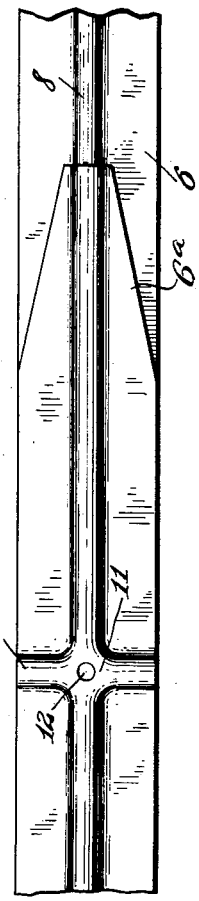
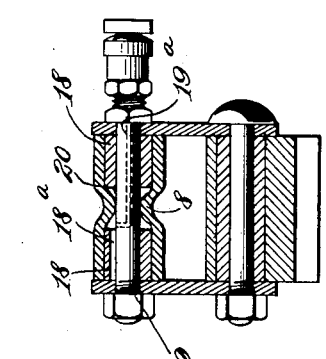
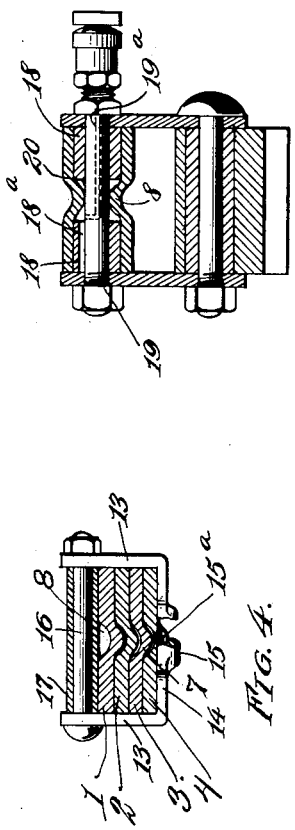
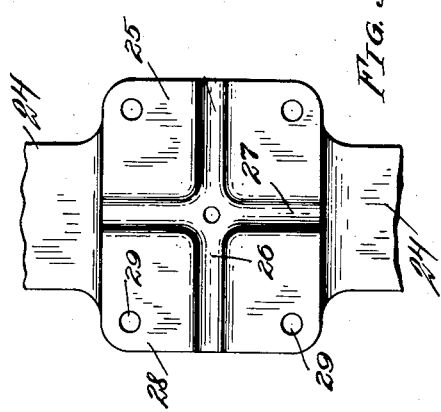
Witnesses:
R. L. Bruck
H. J. Small
Inventor,
John G. Utz
By Hull Smith,
Att'ys.

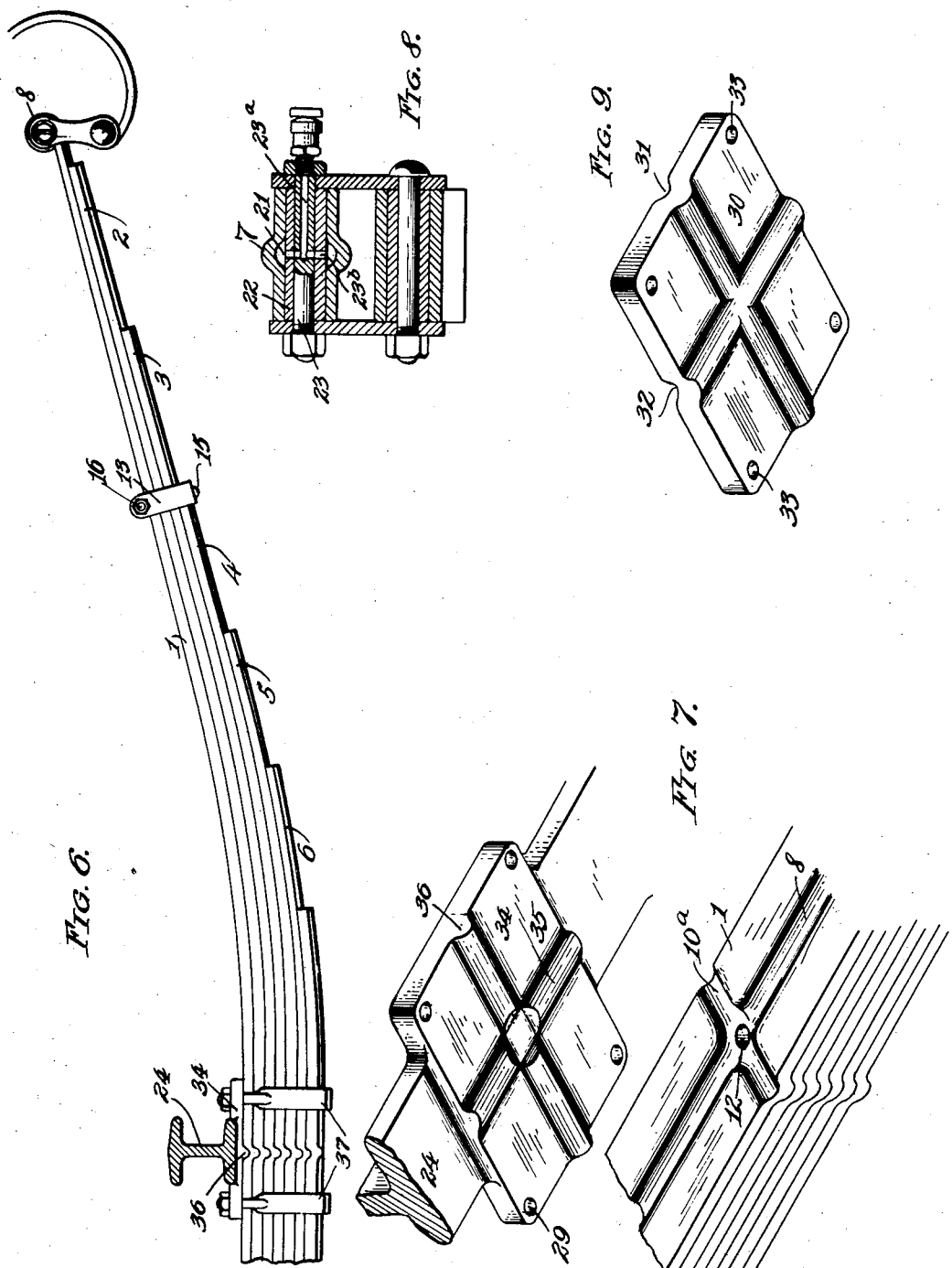

UNITED STATES PATENT OFFICE.

JOHN G. UTZ, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,330,923.      Specification of Letters Patent.      Patented Feb. 17, 1920.

Application filed February 17, 1915. Serial No. 8,883.

*To all whom it may concern:*

Be it known that I, JOHN G. UTZ, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and has for its general object to produce a spring of this character which will be extremely efficient in operation, particularly in the matter of securing a maximum capacity with a minimum weight of metal in the spring. Further objects of the invention are to provide a spring having an improved connection between the body thereof and the axle; to provide a construction of spring which, should occasion require, will permit of an extremely convenient mode of lubrication; to provide for springs of this character an improved eye construction; to provide for springs of this character an improved construction and arrangement of rebound clip; also to provide, in springs of the flat-leaf type, an improved construction and arrangement of the plate ends whereby ideal uniform deflection of the spring may be practically obtained.

With the foregoing objects in view, the invention may be further and more generally defined as consisting of the combinations of parts and elements embodied in the claims hereto annexed and illustrated in the drawings accompanying and forming part hereof, wherein Figure 1 represents a side elevation of a little more than half of a spring of the semi-elliptic type constructed in accordance with my invention; Fig. 2 a plan view of the central portion of the bottom of the spring; Fig. 3 a plan view of the spring seat; Fig. 4 a transverse sectional view taken through the spring shown in Fig. 1 adjacent to the rebound clip; Fig. 5 a sectional view of the spring taken through the eye; Fig. 6 is a view, similar to Fig. 1, showing my spring arranged for suspension; Fig. 7 is a detail in perspective showing the spring seat and the coöperating part of the spring of Fig. 6; Fig. 8 is a sectional view through a modified form of spring eye; and Fig. 9 is a perspective view of an adapter plate that may be used where the axle is not provided with a special spring seat.

Describing by reference characters the various parts illustrated herein, 1 denotes the main leaf and 2, 3, 4, 5, 6, and $6^a$ the auxiliary leaves of a spring of the semi-elliptic type. For the purpose of securing maximum strength or carrying capacity with a minimum weight of metal, each plate of the spring is provided with a central longitudinal rib pressed therefrom, the rib being indicated at 7 and the complementary recess—provided in forming the rib—being indicated at 8. It is one of the features of my invention that the grooves shall be of slightly greater depth and width than the ribs, whereby a clearance space is provided between each rib and the groove of the adjacent plate, the space extending entirely about the rib, as clearly shown in Fig. 4. This not only facilitates the assembling of the plates, since it accommodates all variations in the gage of the stock used, but provides channels between the bottom of one plate and the top of the next plate for the reception and distribution of a lubricating agent or an anti-rust compound. This agent or compound may be conveniently applied at the ends of the plates, as occasion may require. Furthermore, in providing the plates with ribs and grooves, the groove in any plate will be of no greater depth than the thickness of the lightest gage of metal ordinarily used in spring construction. Otherwise grinding off the rib on the opposite side of the plate would result in cutting through the middle of the plate. However, the rib and groove of each spring plate will be of the same dimensions, irrespective of the gage of the metal.

For the purpose of assembling the spring and securing the same to the spring seat, each plate is preferably provided at its central portion with a transverse rib 10 extending entirely thereacross, there being a corresponding transverse recess $10^a$ on the opposite side. In order to facilitate assembling and handling, the longitudinal rib 7 and the transverse rib 10 will form at their intersection a substantially flat seat 11, this seat being adapted to receive a bolt head or a nut. Also, for convenience of assembling the spring plates for finishing, shipment, etc., each plate will preferably be provided with a central bore 12 at the intersection of said ribs adapted to receive a clamping bolt. It will be observed that the ends of the plates—with the exception of the main plate—are tapered. This tapering is for the purpose of securing, as nearly as possible, the ideal uniform stress in the spring. In thus tapering the points of the plates, each plate is beveled from opposite sides toward the end, leaving the rib untouched, and this mode of tapering the ends of the plates results in more nearly approximating the ideal uniform stress of the spring as a whole when deflected than is attainable through any other construction with which I am acquainted.

The ribs will always project from the compression sides of the spring plates. In connection with the ribbed spring construction, I have provided a rebound clip wherein it is possible to eliminate the necessity for a rivet or an eye for securing the clip to the spring and wherein the plates will be free to move longitudinally with respect to each other without any interference by the clip. The clip may be conveniently constructed in the manner shown in Fig. 4, comprising generally a pair of side plates or straps 13 connected at one end by a transverse plate 14 and at the opposite end by a bolt, the plates 13 and 14 constitute a substantially U-shaped clevis or yoke. The transverse plate or member is rounded at its central portion, as indicated at 15, whereby it is adapted to fit within a concave recess 15$^a$ cut through the rib of the shortest plate therebeneath. The upper ends of the straps 13 are connected by a bolt 16, said bolt extending through a tubular bushing 17 which is adapted to minimize the gripping action or friction exerted between the clip and the main plate while the clip performs its normal function of preventing the leaves from separating.

Where the eye is formed by bending the end of the main plate toward the compression side, this will result in bringing the central rib inwardly, as shown in Fig. 5. In this case, I provide a bushing which consists of two symmetrical cylindrical sections 18, which are adapted to be pressed into the eye from opposite ends thereof and to extend substantially as far as the rib 7. The spring bolt 19 extends through the bushing sections, clearing the rib 7, and the space in the center of the eye between the bushing sections provides a chamber 20 for lubricant, which chamber may be supplied conveniently by means of a channel 19$^a$ bored through the bolt or a channel 18$^a$ cut through a bushing section.

When the eye is formed by rolling the end of the plate toward the tension side of the plate (as shown in Figs. 6 and 8) this results in bringing the rib 7 outwardly, with the complementary groove also projected outwardly and forming an annular chamber 21. When the eye is formed in the manner just described, a cylindrical bushing 22 for the spring bolt may be inserted in the usual manner, the chamber 21 extending around the bushing forming a lubricant chamber. The lubricating agent may be conveniently supplied to this chamber by means of a bore or channel 23$^a$ extending longitudinally of the bolt 23 from one end to the central portion thereof and connected by a transverse port 23$^b$ with the chamber 21, the port extending through the bolt and the bushing.

Reference has been made hereinbefore to the transverse ribs 10 which are provided at the central portion of each plate. These ribs not only facilitate the assembling and locking together of the plates, but provide means whereby the spring as a whole may be connected to its spring seat without the use of any center bolt. In the construction shown in Figs. 1 and 2, the spring is shown as seated on top of the axle. Where the axle is designed with special reference to springs of the type disclosed herein, the top of the axle will be provided with longitudinal and transverse recesses adapted to receive the longitudinal and transverse ribs on the bottom plate. In the drawing, 24 denotes a front axle of the I-beam type, which axle is shown as provided with a spring seat 25 having a longitudinal recess 26 and a transverse recess or groove 27 which are adapted respectively to receive the ribs 7 and 10. This spring seat is shown as provided with flat seating portions 28 having apertures 29 for the reception of the usual clip bolts.

In some cases it is desirable to use an adapter plate in addition to a spring seat such as shown in Fig. 3. In such cases, I may employ adapter plates such as shown in Fig. 9 and designated 30, said plate having the longitudinal recess 31, transverse recess 32 and apertures 33, corresponding to the parts 26, 27, and 29 of said spring seat. This adapter plate will receive the ribs on the bottom of the short plate and form a seat therefor, the ribs on said plate being received within the recesses or grooves 26 and 27 of the spring seat and the plate being secured upon said seat by means of the clip bolts which extend through the apertures 29 in said seat and the apertures 33 in said plate. It will be evident that, because of the engagement of the transverse ribs of the spring plates with the corresponding recesses therebelow, the driving strain will be transmitted from the frame to the axle without the necessity of any center bolt whatever, and it becomes impossible for the spring to move laterally or longitudinally with respect to the axle unless the ribs of the spring lift out of the grooves in the axle or adapter plate.

In Fig. 6, I have shown the spring applied to the bottom of the axle, as is the practice with "underslung" suspension. In this case, the spring seat 34 is located on the lower side of the axle and is provided with a downwardly projecting longitudinal rib 35 and a transverse rib 36, adapted to enter the corresponding grooves in the top of the main plate 1. The clips 37 in this case will be applied from beneath, with their upper ends projecting through suitable apertures or recesses in the spring seat.

Having thus described my invention, what I claim is:

1. A spring comprising a main plate and a plurality of auxiliary plates, the plates being provided each with a centrally located longitudinal rib projecting from the compression side thereof and with a complementary groove or recess in the opposite side thereof, said ribs and grooves being of uniform width throughout their extent and each extending longitudinally the full length of its plate, each of the auxiliary plates being provided with substantially triangular pointed ends, the pointing of each plate end being accomplished by removing the metal from the central rib outwardly while leaving the rib substantially intact.

2. A spring comprising a plurality of plates each having the compression side thereof provided with a longitudinal rib and with a central transverse rib extending entirely thereacross, each plate being provided with grooves or recesses complementary to said ribs.

3. The combination, with a spring comprising a plurality of plates each having projecting from one face a longitudinal rib and a transverse rib extending thereacross and having in its opposite face grooves complementary to said ribs, of a spring seat having a longitudinal groove and a transverse groove whereby it is adapted to receive the ribs of a coöperating spring plate, and means for securing the spring to the seat.

4. The combination, with an axle, of a spring comprising a plurality of superposed plates each having a longitudinal rib projecting from the compression side thereof and each having a transverse rib projecting from the central portion of its compression side and each plate being provided with grooves in its tension side complementary to the ribs, and an adapter plate having grooves coöperating with and adapted to receive the longitudinal and transverse ribs of the adjacent spring plate, and adapted to be secured to the spring and to the axle.

5. The combination, with an axle, of a spring comprising a plurality of superposed plates each having a longitudinal rib projecting from the compression side thereof and each having a transverse rib projecting from the central portion of its compression side and each plate being provided with grooves in its tension side complementary to the ribs, and an adapter plate having in one face thereof grooves complementary to the ribs of an adjacent spring plate and having in its opposite face ribs complementary to said grooves, the last mentioned plate being adapted to be secured to the spring and to the axle.

6. A spring comprising a plurality of superposed plates of varying length, each plate having a longitudinal rib projecting from its compression side and a complementary groove or recess in its tension side, the rib of one of said plates having a rounded recess, a rebound clip for said spring comprising a substantially U-shaped frame or yoke the cross bar or plate whereof is rounded to coöperate with the rounded recess in the rib of the plate with which it coöperates, and a bolt extending through the ends of the parallel members of the frame or yoke and having an antifriction bearing upon its coöperating spring plate.

7. A spring comprising a plurality of superposed plates of varying length, each plate having a longitudinal rib, the rib of one of said plates having a recess therein, a rebound clip for said spring comprising a substantially U-shaped frame or yoke, the cross bar or plate whereof extends across and through the recess in the rib of the plate with which it coöperates, and a bolt extending through the ends of the parallel members of the frame or yoke.

8. A spring comprising a plurality of superposed plates each having a longitudinal rib projecting from its compression side and a complementary groove in its tension side, the rib of one of said plates having a rounded recess, and a rebound clip secured to said spring, said clip comprising a U-shaped yoke or frame the transverse bar whereof is rounded thereby to engage the rounded recess in the rib of its coöperating plate, a bolt connecting the parallel ends of the yoke or frame, and a bushing mounted on said bolt and forming a roller bearing with the adjacent spring plate.

9. A spring comprising a plurality of superposed plates each having a longitudinal rib, the rib of one of said plates having a recess therein, and a rebound clip secured to said spring, said clip comprising a substantially U-shaped yoke or frame the transverse bar whereof extends through the recess in the rib of its coöperating plate, a bolt connecting the parallel ends of the yoke or frame, and a bushing mounted on said bolt and forming a roller bearing with the adjacent spring plate.

10. A spring comprising a plurality of superposed plates each having a longitudinal rib, the rib of one of said plates having a transversely extending recess, and a rebound clip comprising a substantially U-shaped frame the transverse member of which is adapted to engage the recess in the rib of its coöperating plate, and an anti-friction connection between the opposite ends of the frame and the coöperating spring plate.

11. The combination, with a spring eye formed by rolling a plate having a rib projecting from its compression side and a complementary recess in its tension side, of a bushing within said eye, there being a central chamber within the eye, said bushing being provided with means for conducting lubricant to said chamber.

12. The combination, with a spring eye, of a bushing in said eye, said eye having a central chamber surrounding the bushing, and means for conducting lubricant to said chamber.

13. The combination, with a spring eye, of a bushing in said eye, said eye having an outwardly projecting chamber extending around the bushing, and a bolt extending through said bushing and having a channel for lubricant extending inwardly from one end thereof, said bushing having a port through which lubricant from said channel enters said chamber.

14. The combination, with a spring eye, of a bushing in said eye, said eye being provided with a central chamber, and means for conducting lubricant through said bushing to said chamber.

15. The combination, with a spring comprising a plurality of plates each having projecting from one face thereof a longitudinal rib and a transverse rib extending thereacross and having on its opposite face grooves complementary to said ribs, of a spring seat having a longitudinal groove and a transverse groove adapted to receive the corresponding ribs of a coöperating spring plate and being provided with surfaces between the outer portions of said grooves conforming in shape to and adapted to bear against coöperating surfaces of a spring plate, and means for securing the spring to said seat.

In testimony whereof, I hereunto affix my signature in the presence of two witnesses.

JOHN G. UTZ.

Witnesses:
JOHN B. HULL,
BRENNAN B. WEST.